United States Patent
Yoshida

(10) Patent No.: US 8,985,271 B1
(45) Date of Patent: Mar. 24, 2015

(54) EXHAUST MUFFLER FOR VEHICLE

(71) Applicant: Kawasaki Jukogyo Kabushiki Kaisha, Hyogo (JP)

(72) Inventor: Atsuya Yoshida, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/062,179

(22) Filed: Oct. 24, 2013

(51) Int. Cl.
*F01N 1/08* (2006.01)
*F01N 13/08* (2010.01)

(52) U.S. Cl.
CPC ................................ *F01N 13/082* (2013.01)
USPC ........................................ 181/269; 181/249

(58) Field of Classification Search
CPC ..... F01N 3/02; F01N 3/0215; F01N 2230/04; F01N 2250/12; F01N 3/2885
USPC ............................. 181/249, 258, 269; 60/299
See application file for complete search history.

(56) References Cited

U.S. PATENT DOCUMENTS

| | | | | |
|---|---|---|---|---|
| 3,388,769 A | * | 6/1968 | Martoia | 181/238 |
| 5,376,341 A | * | 12/1994 | Gulati | 422/179 |
| 5,457,290 A | * | 10/1995 | Sase et al. | 181/258 |
| 6,837,336 B2 | * | 1/2005 | Gault et al. | 181/258 |
| 7,347,046 B2 | * | 3/2008 | Ishimoto et al. | 60/312 |
| 7,487,633 B2 | * | 2/2009 | Popik et al. | 60/289 |
| 7,931,120 B2 | * | 4/2011 | Nishimura et al. | 181/258 |
| 2007/0256673 A1 | * | 11/2007 | Bozmoski et al. | 123/568.11 |
| 2011/0272209 A1 | * | 11/2011 | Tauschek et al. | 181/228 |
| 2013/0075192 A1 | * | 3/2013 | Hayama et al. | 181/228 |
| 2013/0087405 A1 | * | 4/2013 | Uchino et al. | 181/228 |

FOREIGN PATENT DOCUMENTS

JP 61-207813 9/1986

* cited by examiner

*Primary Examiner* — Jeremy Luks
(74) *Attorney, Agent, or Firm* — Wenderoth, Lind & Ponack, L.L.P.

(57) ABSTRACT

An exhaust muffler for a vehicle includes a muffler body that is connected to an exhaust pipe and that includes therein a plurality of expansion chambers. The muffler body has an upstream side cover that has an exhaust entrance connected to the exhaust pipe and that closes an upstream side opening of the muffler body, and a communication pipe that couples one of the plurality of expansion chambers positioned in a most upstream side part of an exhaust flow path and the exhaust entrance to each other. The exhaust pipe and the communication pipe are integrally joined to a peripheral portion of the exhaust entrance by a common welding bead.

3 Claims, 8 Drawing Sheets

EXHAUST MUFFLER FOR VEHICLE

BACKGROUND OF THE INVENTION

1. Field of the Invention

The present invention relates to an exhaust muffler for a vehicle. In particular, the present invention relates to an exhaust muffler for a vehicle including a communication pipe that establishes communication between an exhaust entrance portion or an exhaust exit portion and muffler chambers formed in the exhaust muffler.

2. Description of the Related Art

Conventionally, what is known is an exhaust muffler for a vehicle including a communication pipe that establishes communication between a plurality of muffler chambers (for example, an expansion chamber, a resonator chamber, a sound absorption chamber or the like) being formed inside, and an exhaust entrance portion or an exhaust exit portion. The communication pipe guides exhaust gas introduced into the exhaust entrance portion to the exhaust exit portion, while reducing exhaust noises by guiding the exhaust gas successively through a plurality of muffler chambers.

With such an exhaust muffler, the communication pipe is inserted into the exhaust entrance portion, and the circumferential portion of a first side is fixed to the opening peripheral portion of the exhaust entrance portion by welding, whereas the circumferential portion of a second side is fixed to a separator or the like that partitions the inside of the exhaust muffler into a plurality of muffler chambers. Further, to the exhaust entrance portion, the rear end portion of the exhaust pipe connected to an exhaust portion of the engine is connected. Thus, exhaust gas discharged from the engine is guided to the exhaust muffler for a vehicle, whereby exhaust noises are reduced. There is Prior Technique Document JP 61-207813 A.

Meanwhile, as methods for connecting the exhaust pipe to the exhaust entrance portion, the following are known: a screwing method with use of a flange; a method in which the rear end portion of the exhaust pipe is flared to be enlarged and fixed by welding to the exhaust entrance portion so as to surround the exhaust entrance portion; a method in which the exhaust pipe is inserted into the communication pipe and fixed by welding at the front end peripheral portion of the communication pipe, and the like. However, every one of these methods necessitates preparing the joining portion separately between the exhaust pipe and the exhaust entrance portion. Accordingly, manufacturing is not easy, and an increase in costs is invited.

SUMMARY OF THE INVENTION

The present invention is made in consideration of the foregoing problems, and an object thereof is to provide an exhaust muffler for a vehicle, productivity of which can be improved.

In order to achieve the object stated above, the present invention provides an exhaust muffler for a vehicle including a muffler body that is connected to an exhaust pipe and that includes therein a plurality of expansion chambers. The muffler body has an upstream side cover that has an exhaust entrance connected to the exhaust pipe and that closes an upstream side opening of the muffler body, and a communication pipe that couples one of the plurality of expansion chambers positioned in a most upstream side part of an exhaust flow path and the exhaust entrance to each other. The exhaust pipe and the communication pipe are integrally joined to a peripheral portion of the exhaust entrance by a common welding bead.

With the structure described above, three components can be joined together by a common welding bead. This makes it possible to unify the welding place for joining the exhaust pipe to the peripheral portion of the exhaust entrance and the welding place for joining the communication pipe to the peripheral portion of the exhaust entrance. Thus, the number of welding places can be reduced, and productivity of the exhaust muffler for a vehicle can be improved.

In the exhaust muffler, preferably, the following structure can be employed.

(1) A catalyst is arranged inside the communication pipe.

With the structure (1), the catalyst can be arranged in the muffler body, without inviting an increase in the number of components and welding places. That is, in the case where the catalyst is stored in a catalyst retaining pipe and the catalyst retaining pipe is joined to the communication pipe, it becomes necessary to prepare the catalyst retaining pipe, and the catalyst retaining pipe and the communication pipe must be joined to each other. However, with the present structure, the catalyst is directly arranged in the communication pipe, whereby the catalyst retaining pipe can be dispensed with, and the number of welding places for joining the catalyst retaining pipe and the communication pipe to each other can be reduced. Hence, productivity of the exhaust muffler for a vehicle can be improved.

(2) In the structure (1), the inner diameter of the communication pipe is substantially identical to the outer diameter of the catalyst, and the length of the communication pipe in the exhaust flow path direction is at least approximately twice as great as the length of the catalyst. The catalyst is arranged near a downstream end part of the exhaust flow path in the communication pipe.

With the structure (2), exhaust gas can be sufficiently diffused on the upstream side in the exhaust flow path relative to the catalyst, whereby the exhaust gas is allowed to uniformly flow toward the upstream side end face of the catalyst. Thus, the flow of exhaust gas toward the catalyst can be suppressed from becoming unbalanced, and the catalyst can be efficiently activated.

DETAILED DESCRIPTION OF THE INVENTION

Embodiment

[Overall Structure]

In the following, with reference to the accompanying drawings, a description will be given of one embodiment of the present invention. Note that, for the sake of convenience in describing, the following description is based on the premise that the front-rear direction of a vehicle is applied to the front-rear direction of the exhaust muffler and other components, and that the right-left direction in connection with the vehicle-width direction (the right and left sides as seen from the rear of the vehicle) as seen from the passengers on the vehicle is applied to the right-left direction of the exhaust muffler and other components.

Figure 1:
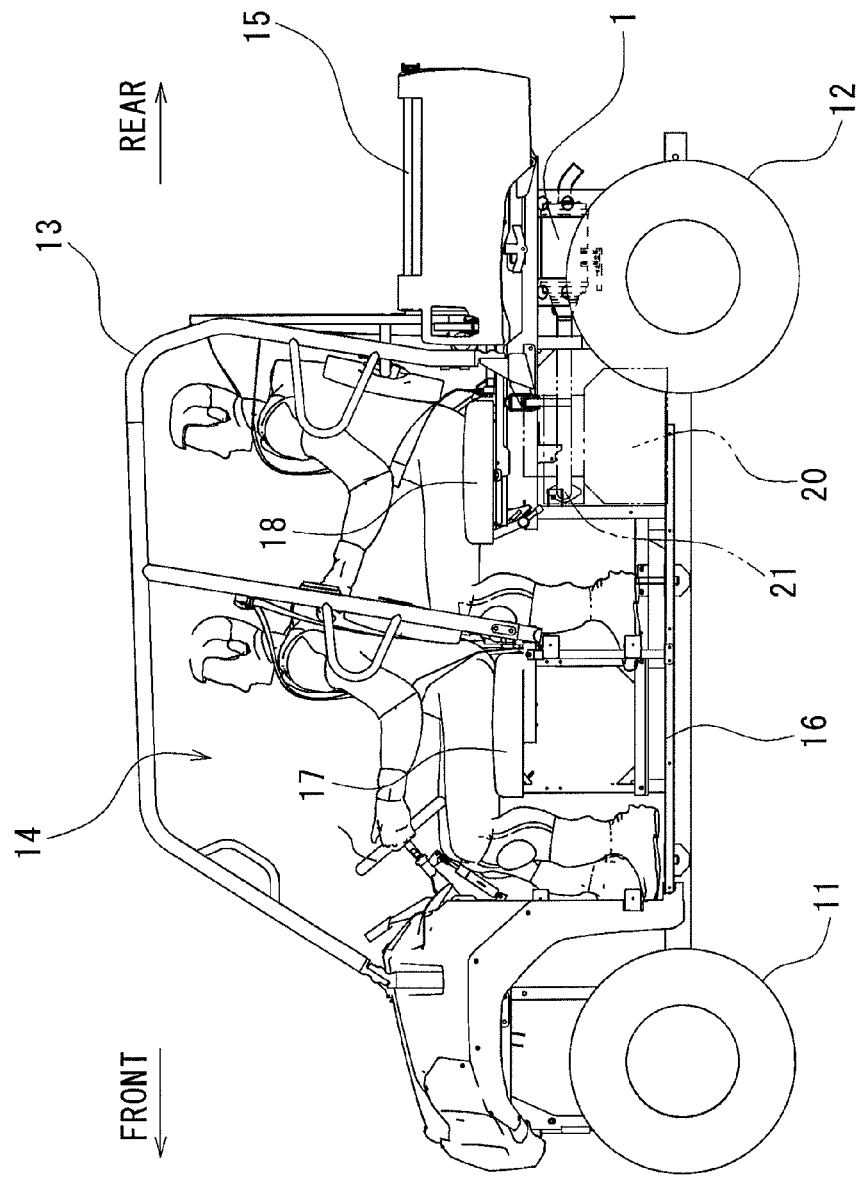
FIG. 1 is a left side view of a utility vehicle according to one embodiment.

FIG. 1 is a left side view of a utility vehicle according to the present embodiment, with shell constituent members such as doors being removed. As shown in FIG. 1, the utility vehicle includes: a right and left pair of front wheels 11 on the front side and a right and left pair of rear wheels 12 on the rear side; a passenger space 14 surrounded by a ROPS 13, between the front wheels 11 and the rear wheels 12; and a rear deck 15 on the rear side of the passenger space 14. The ROPS 13 is an abbreviation for a rollover protective structure.

In the passenger space 14, a floor panel 16 forming the floor surface, a front seat 17, and a rear seat 18 are provided. Below the rear seat 18, an engine 20 is stored. In front of the engine 20, an exhaust portion 21 for discharging exhaust gas is provided. To the exhaust portion 21, an exhaust system 1 is connected, and the exhaust gas discharged from the engine 20 is purified by the exhaust system 1 with exhaust noises being cancelled, and discharged into the air.

[Exhaust System 1]

Figure 2:
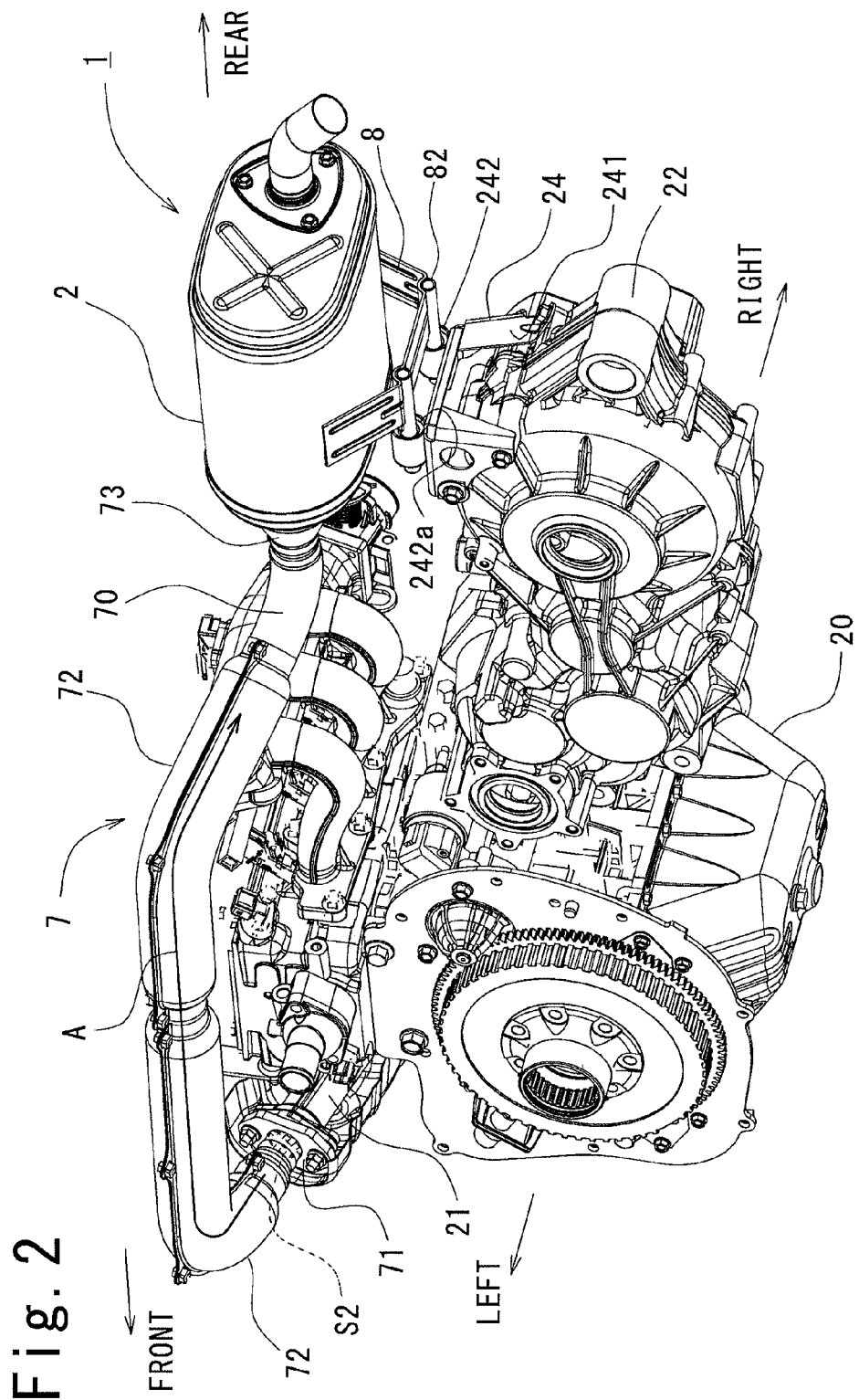
FIG. 2 is a perspective view of an exhaust system.

With reference to FIG. 2, a description will be given of the exhaust system 1. FIG. 2 is a perspective view of the exhaust system 1, together with the engine 20 and a transmission 22. As shown in FIG. 2, the exhaust system 1 includes an exhaust pipe 7 fixed to an exit portion of the exhaust portion 21 via a flange 71, and an exhaust muffler 2 being fixed by welding to the downstream end portion of the exhaust pipe 7. The exhaust muffler 2 is arranged at the substantially center portion in the vehicle-width direction and below the rear deck 15 (see FIG. 1). The exhaust muffler 2 is mounted on an exhaust muffler mounting portion 24 mounted at an upper portion of the transmission 22, via an exhaust muffler mounting apparatus 8.

The exhaust muffler mounting portion 24 has a support bracket 241 fixed to the upper portion of the transmission 22, and rod engaging portions 242 fixed by welding to the top face of the support bracket 241. The rod engaging portions 242 are provided to form a right and left pair, and each provided with a rubber damper 242a having a bore penetrating in the front-rear direction. Into the bore of the rubber damper 242a, a rod 82 of the exhaust muffler mounting apparatus 8 is inserted in the front-rear direction, whereby the exhaust muffler 2 is held.

[Exhaust Pipe 7]

The exhaust pipe 7 extends from the flange 71, via a pipe 70 being curved to detour around the engine 20 from the left side toward the rear side, and reaches the exhaust muffler 2 via an entrance cone portion 73. On the outer surface of the pipe 70, a heat shield plate 72 is attached, whereby heat is prevented from dissipating from the surface of the pipe 70 to the surrounding components. To the entrance cone portion 73, a sensor mounting boss 74 (see FIG. 3) for mounting an exhaust gas sensor is provided.

[Exhaust Muffler 2]

Figure 3:
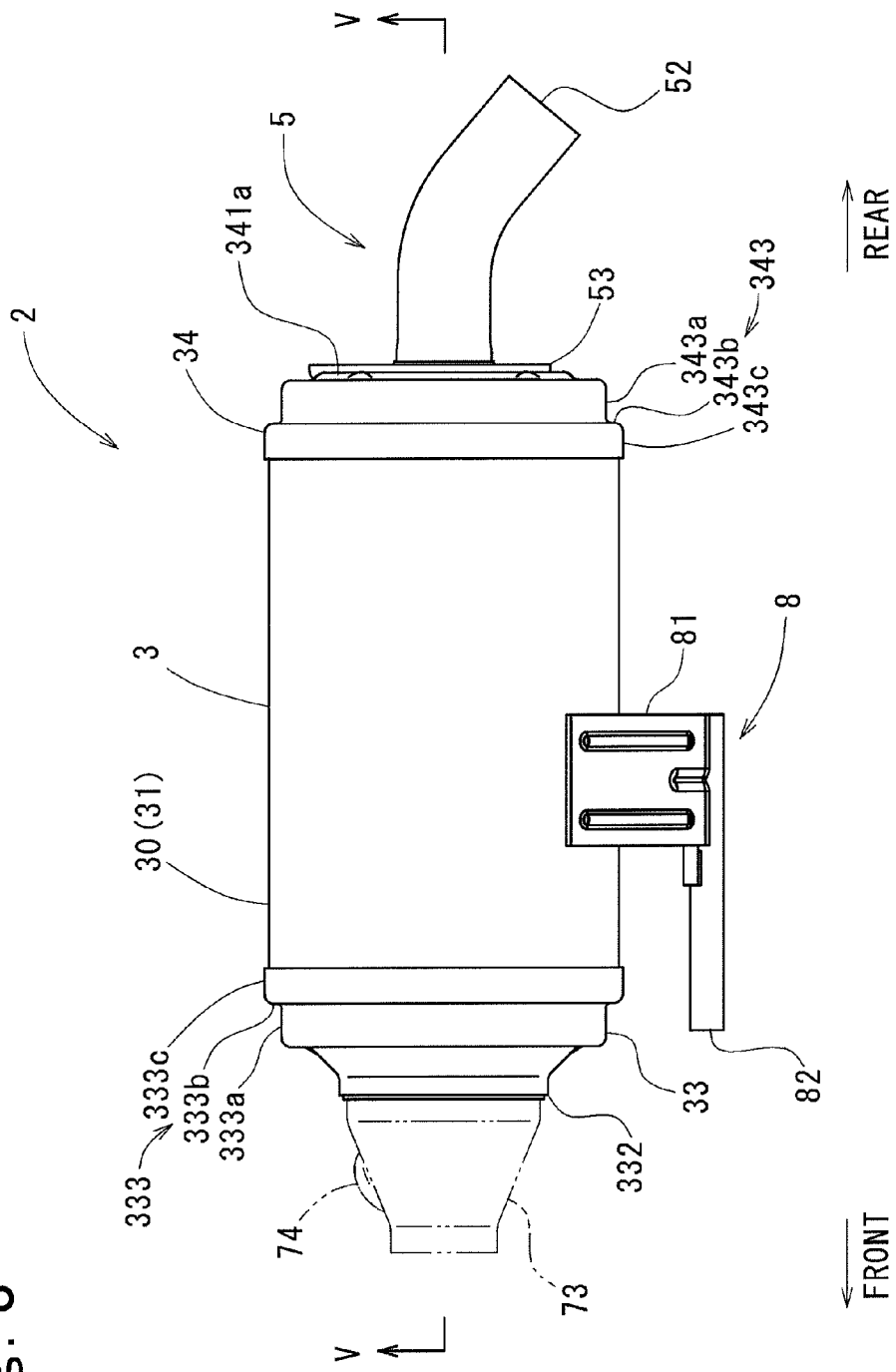
FIG. 3 is a left side view of an exhaust muffler.
Figure 4:
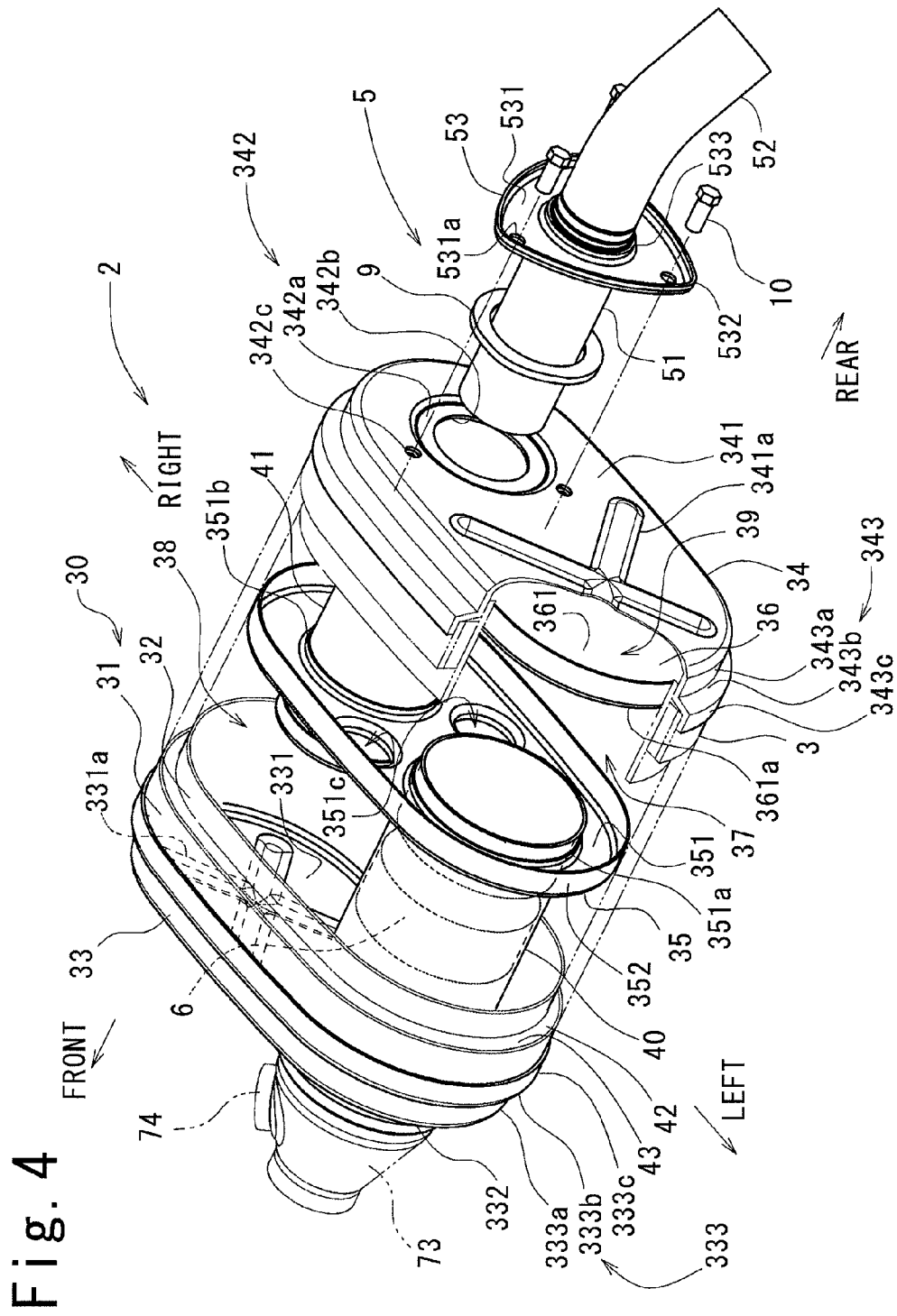
FIG. 4 is an exploded perspective view of the exhaust muffler.
Figure 5:
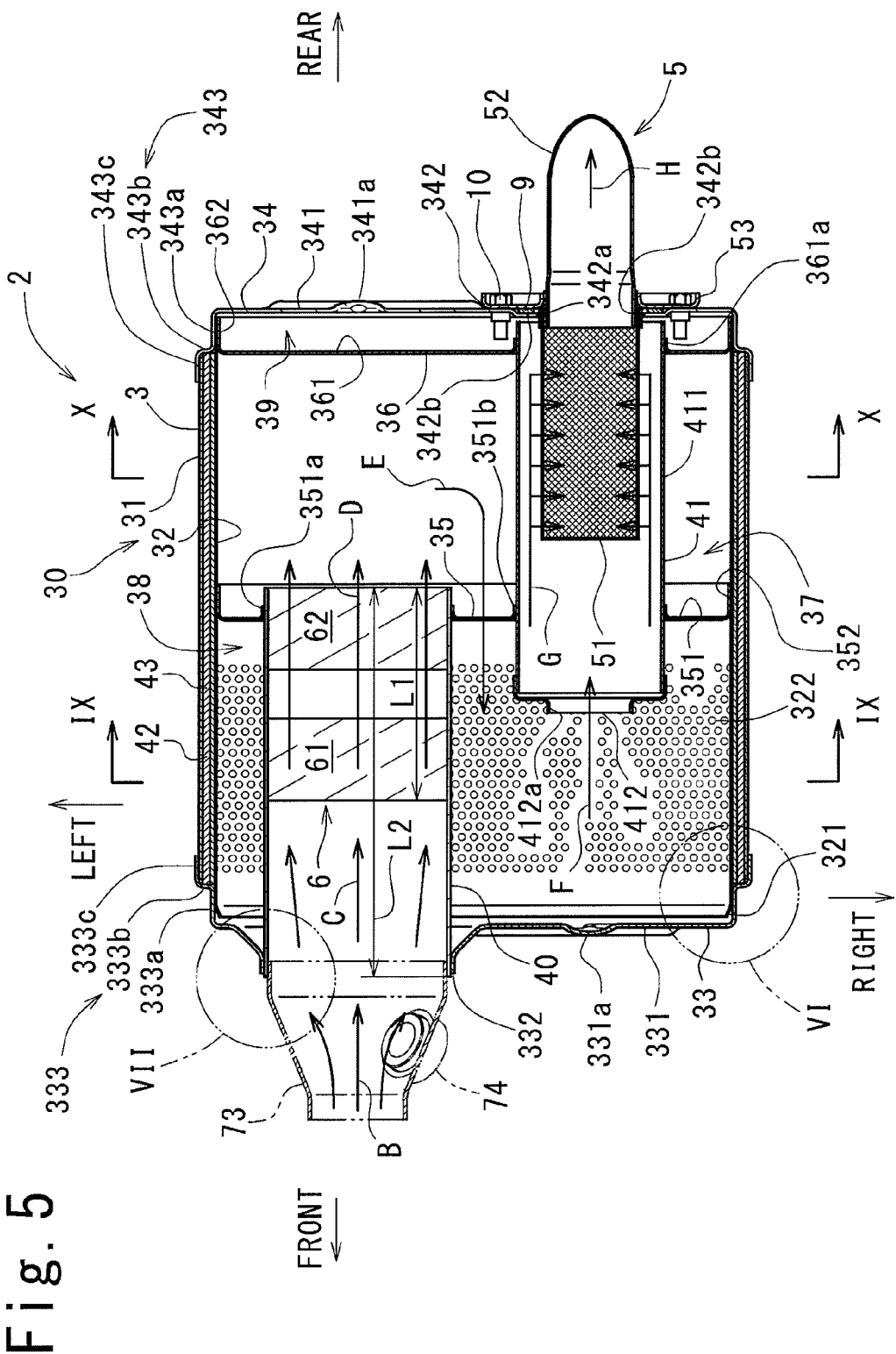
FIG. 5 is a V-V cross-sectional view of the exhaust muffler shown in FIG. 3.
Figure 6:
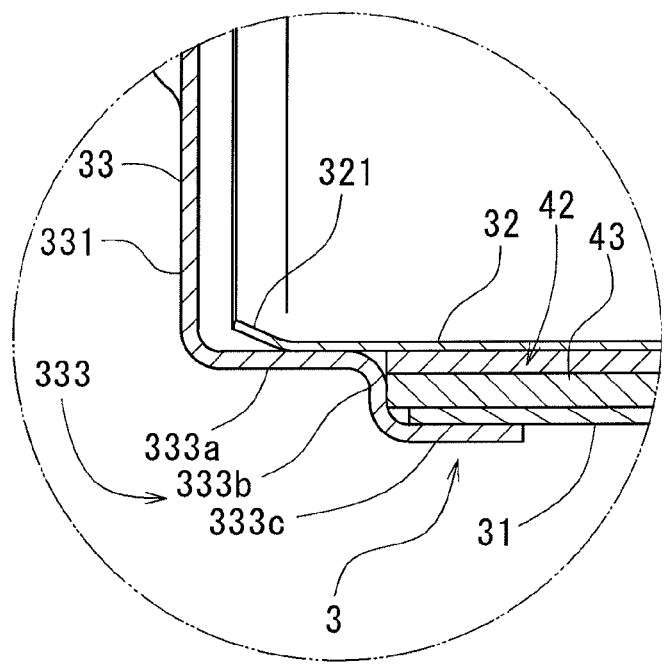
FIG. 6 is a VI-part enlarged view of the exhaust muffler shown in FIG. 5.
Figure 7:
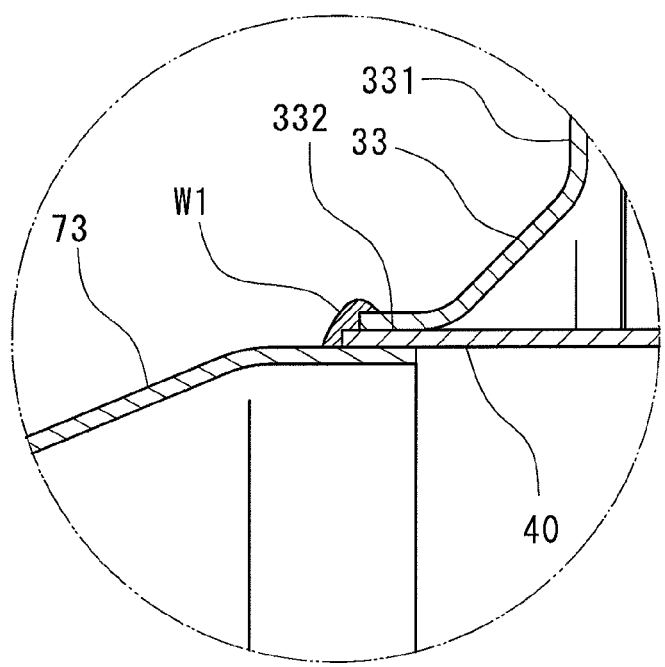
FIG. 7 is a VII-part enlarged view of the exhaust muffler shown in FIG. 5.

With reference to FIGS. 3 to 7, a description will be given of the exhaust muffler 2. FIG. 3 is a left side view of the exhaust muffler 2. FIG. 4 is an exploded perspective view of the exhaust muffler 2. FIG. 5 is a V-V cross-sectional view of FIG. 3. FIG. 6 is a VI-part enlarged view of FIG. 5. FIG. 7 is a VII-part enlarged view of FIG. 5. In FIG. 4, a sleeve portion 30 and the downstream side cover 34 are partially transparent to show the internal structure, and the exhaust muffler mounting apparatus 8 is not shown.

As shown in FIG. 3, the exhaust muffler 2 includes a muffler body 3, a spark arrester 5 mounted on the rear portion of the muffler body 3, and the exhaust muffler mounting apparatus 8 mounted on the bottom portion of the muffler body 3. As shown in FIG. 4, a gasket 9 is assembled between the spark arrester 5 and the muffler body 3.

(Muffler Body 3)

The muffler body 3 has a shell formed by the sleeve portion 30, an upstream side cover 33 closing the upstream side opening of the sleeve portion 30, and a downstream side cover 34 closing the downstream side opening of the sleeve portion 30. At the upstream side cover 33, an exhaust entrance portion 332 connected to the entrance cone portion 73 of the exhaust pipe 7 (see FIG. 2) is formed. At the downstream side cover 34, an exhaust exit portion 342 to which a spark arrester 5 is connected is formed.

In the muffler body 3, an upstream side separator 35 and a downstream side separator 36 are provided. A second expansion chamber 38 is formed between the upstream side cover 33 and the upstream side separator 35, and a first expansion chamber 37 is formed between the upstream side separator 35 and the downstream side separator 36. By the provision of the downstream side separator 36, the downstream side of the exhaust muffler body 3 becomes the double structure, and a heat insulation chamber (or a sound shield chamber) 39 is formed between the downstream side separator 36 and the downstream side cover 34. That is, in the muffler body 3, the second expansion chamber 38, the first expansion chamber 37, and the heat insulation chamber 39 are formed in turn from the front side.

Further, the muffler body 3 is provided with an entrance communication pipe 40 communicatively connecting between the exhaust entrance portion 332 and the first expansion chamber 37, and an exit communication pipe 41 communicatively connecting between the second expansion chamber 38 and the exhaust exit portion 342.

Next, a specific description will be given of the constituent elements of the muffler body 3.

Upstream Side Cover 33

The upstream side cover 33 has a front wall 331, an exhaust entrance portion 332 formed at the substantially left half surface of the front wall 331, and an upstream side cover flange portion 333 projecting rearward from the circumference of the front wall 331. At the substantially right half surface of the front wall 331, a substantially X-shaped reinforcing bead 331a projecting frontward is formed. Formation of the reinforcing bead 331a improves the surface stiffness of the front wall 331, whereby vibration noises (chattering noises) of the front wall 331 are suppressed. Furthermore, as the reinforcing bead 331a is formed so as to project frontward, the volume of the muffler body 3 increases.

As shown in FIG. 5, the exhaust entrance portion 332 has a burring-like (protruding) opening shape projecting frontward (i.e., in an upstream direction), and has its front portion externally fitted to the outer circumferential surface of the entrance communication pipe 40. The front end on of the protrusion-shaped exhaust entrance portion 332 is positioned further rearward than the front end of the entrance communication pipe 40.

Referring back to FIG. 4, the upstream side cover flange portion 333 has an upstream side inner sleeve holding portion 333a projecting rearward from the periphery of the front wall 331, and an upstream side outer sleeve holding portion 333c projecting rearward from the upstream side inner sleeve holding portion 333a via an upstream side step portion 333b. The upstream side outer sleeve holding portion 333c is positioned radially outward than the upstream side inner sleeve holding portion 333a.

Downstream Side Cover 34

The downstream side cover 34 has a rear wall 341, an exhaust exit portion 342 formed at the substantially right half surface of the rear wall 341 and a downstream side cover flange portion 343 projecting frontward from the periphery of the rear wall 341. At the substantially left half surface of the rear wall 341, a substantially X-shaped reinforcing bead 341a projecting rearward is formed. Formation of the reinforcing bead 341a improves the surface stiffness of the rear wall 341, whereby vibration noises (chattering noises) of the rear wall 341 are suppressed. Furthermore, as the reinforcing bead 341a is formed so as to project rearward, the volume of the muffler body 3 increases.

The exhaust exit portion 342 has a gasket mounting face 342a formed in a concave manner frontward from the rear wall 341, an exhaust exit opening 342b bored at the gasket mounting face 342a, and a spark arrester mounting portion 342c provided on the rear wall 341 radially outward than the gasket mounting face 342a.

The downstream side cover flange portion 343 has a downstream side inner sleeve holding portion 343a projecting frontward from the periphery of the rear wall 341, and a downstream side outer sleeve holding portion 343c further projecting frontward from the downstream side inner sleeve holding portion 343a via a downstream side step portion 343b. The downstream side outer sleeve holding portion 343c is positioned radially outward than the downstream side inner sleeve holding portion 343a.

Sleeve Portion 30

As shown in FIG. 5, the sleeve portion 30 includes an outer sleeve 31, an inner sleeve 32 positioned as being distanced from the outer sleeve 31 radially inwardly, and a sound absorption chamber 42 formed between the outer sleeve 31 and the inner sleeve 32. A sound absorbing material 43 is enclosed in the sound absorption chamber 42. The sound absorbing material 43 has, for example, a two-layer structure, and is structured by stainless steel wool arranged on the inner sleeve 32 side and glass wool arranged on the outer sleeve 31 side. Note that, the sound absorbing material 43 may be formed in a single-layer structure.

The outer sleeve 31 is a cylindrical element formed of a steel plate being wound in an elliptical manner, the abutting ends of which are joined to each other by welding. The outer sleeve 31 extends from the upstream side outer sleeve holding portion 333c to the downstream side outer sleeve holding portion 343c. The front portion of the outer sleeve 31 is fixed by welding to the rear end peripheral portion of the upstream side outer sleeve holding portion 333c, and the rear portion of the outer sleeve 31 is fixed by welding to the front end peripheral portion of the downstream side outer sleeve holding portion 343c.

The inner sleeve 32 is a cylindrical element formed of a steel plate being wound in an elliptical manner, the abutting ends of which are joined to each other by welding. The inner sleeve 32 extends from the upstream side inner sleeve holding portion 333a to the downstream side inner sleeve holding portion 343a. The front portion of the inner sleeve 32 has its outer circumferential cylindrical face internally fitted to the upstream side inner sleeve holding portion 333a so as to be slidable in the front-rear direction (that is, in the longitudinal direction of the muffler body 3). On the other hand, the rear portion of the inner sleeve 32 is fixed by welding at several portions in the circumferential direction, as being interposed between the downstream side separator flange portion 362 and the downstream side inner sleeve holding portion 343a.

Since the inner sleeve 32 is held in this manner, the relative elongation between the outer sleeve 31 and the inner sleeve 32 can be tolerated. That is, when exhaust gas flows inside the exhaust muffler body 3, the outer sleeve 31 and the inner sleeve 32 thermally expand in accordance with their respective temperatures. Meanwhile, the sleeve portion 30 has a double structure made up of the outer sleeve 31 and the inner sleeve 32, and furthermore, the sound absorbing material 43 is arranged between the outer sleeve 31 and the inner sleeve 32. Accordingly, the outer sleeve 31 and the inner sleeve 32 are different from each other in temperature. More specifically, the temperature of the inner sleeve 32 facing the first and second expansion chambers 37 and 38 and the heat insulation chamber 39 is higher than that of the outer sleeve 31 being exposed to the air. Therefore, the thermal expansion amount of the inner sleeve 32 is greater than that of the outer sleeve 31.

At this time, the upstream side cover 33 and the downstream side cover 34 become away from each other in accordance with the thermal expansion amount of the outer sleeve 31, and the inner sleeve 32 having its rear portion fixed to the downstream side cover 34 shifts with the downstream side cover 34. On the other hand, the front portion of the inner sleeve 32 slides over the upstream side inner sleeve holding portion 333a of the upstream side cover 33 and thermally expands freely, irrespective of the displacement of the upstream side cover 33 corresponding to the thermal expansion amount of the outer sleeve 31. That is, the relative elongation of the outer sleeve 31 and the inner sleeve 32 is tolerated.

Further, the inner sleeve 32 is provided with many pores 322 that establish communication between the sound absorption chamber 42 and the second expansion chamber 38. Further, as shown in FIG. 6 in an enlarged manner, at the front end portion of the inner sleeve 32, a bent portion 321 that is inwardly bent is formed. Formation of the bent portion 321 allows the inner sleeve 32 to be easily assembled to the upstream side inner sleeve holding portion 333a. Specifically, allowing the bent portion 321 to abut on the entrance portion of the upstream side inner sleeve holding portion 333a, the inner sleeve 32 can be guided and assembled to the upstream side inner sleeve holding portion 333a.

Thus, for example in the case where the upstream side cover 33 is fixed by welding to the outer sleeve 31 and thereafter the inner sleeve 32 is assembled from the downstream side of the outer sleeve 31, the tip portion of the inner sleeve 32 can be easily fitted to the upstream side inner sleeve holding portion 333a at the bottom while being guided by the bent portion 321. That is, the inner sleeve 32 can be easily fitted to the upstream side inner sleeve holding portion 333a at the bottom that cannot easily be visually recognized.

Upstream Side Separator 35

Referring back to FIG. 5, the upstream side separator 35 has an upstream side partition wall 351 that partitions the inner circumferential side of the inner sleeve 32 into the first expansion chamber 37 and the second expansion chamber 38, and an upstream side separator flange portion 352 projecting rearward from the periphery of the upstream side partition wall 351. At the upstream side partition wall 351, a burring-like entrance communication pipe mounting portion 351a and an exit communication pipe mounting portion 351b projecting rearward, and a burring-like communication hole 351c projecting frontward (see FIG. 4) are formed. The upstream side separator 35 is fixed by welding at several portions in the circumferential direction to the inner circumferential face of the inner sleeve 32 via the upstream side separator flange portion 352.

Downstream Side Separator 36

The downstream side separator 36 has a downstream side partition wall 361 that partitions the inner circumferential side of the inner sleeve 32 into the first expansion chamber 37 and the expansion chamber 39, and a downstream side separator flange portion 362 projecting rearward from the periphery of the downstream side partition wall 361. At the downstream side partition wall 361, a burring-like exit communication pipe mounting portion 361a projecting rearward is formed. The downstream side separator 36 is fixed to the downstream side inner sleeve holding portion 343a by welding, together with the rear portion of the inner sleeve 32 as described above, at several portions in the circumferential direction via the downstream side separator flange portion 362.

Entrance Communication Pipe 40

The entrance communication pipe 40 is made of a straight tubular pipe member having a constant (uniform) diameter, and extends rearward from the protrusion-shaped exhaust entrance portion 332 to the rear side of the entrance communication pipe mounting portion 351a. In the entrance communication pipe 40, a catalyst 6 is arranged. As shown in FIG. 7 in an enlarged manner, the front end of the exhaust entrance portion 332 and the front end of the entrance communication pipe 40 are arranged stepwise on the outer circumference of the entrance cone portion 73, and these three components are integrally joined by a common welding bead W1. Referring back to FIG. 5, the rear portion of the entrance communication pipe 40 is joined by welding at several portions in the circumferential direction to the entrance communication pipe mounting portion 351a.

Catalyst 6

The catalyst 6 is structured by a first catalyst 61 and a second catalyst 62, in each of which a honeycomb carrier made of metal is supported noble metal. The second catalyst 62 has its downstream side end face substantially matched with the downstream end portion of the entrance communication pipe 40. The first catalyst 61 is arranged to be away on the upstream side by a prescribed distance relative to the second catalyst 62.

Distance L1 between the upstream side end face of the first catalyst 61 and the downstream side end face of the second catalyst 62 is sufficiently shorter than length L2 of the entrance communication pipe 40. For example, distance L1 is set to be substantially half as great as L2. That is, in front of the first catalyst 61 in the entrance communication pipe 40, a space having a substantially identical inner diameter as the outer diameter of the first catalyst 61 is formed over a prescribed length.

The first catalyst 61 and the second catalyst 62 are fixed by brazing to the inner circumferential face of the entrance communication pipe 40.

Exit Communication Pipe 41

The exit communication pipe 41 has a straight tubular pipe member 411 having a constant diameter, and a lid member 412 joined by welding to the front end portion of the pipe member 411. The pipe member 411 extends from the front of the exit communication pipe mounting portion 351b to immediately before the exhaust exit portion 342 via the exit communication pipe mounting portion 361a. Note that, the central axis of the pipe member 411 is substantially identical to the central axis of the exhaust exit opening 342b. The rear end position of the pipe member 411 is set so as not to be in contact with the exhaust exit portion 342, in consideration of the shape tolerance, the assembly tolerance, the thermal expansion amount and the like of each component.

At the lid member 412, a burring-like opening 412a projecting frontward is formed. The exit communication pipe 41 is fixed by welding at several portions in the circumferential direction to the exit communication pipe mounting portion 351b of the upstream side separator 35 at a slightly frontward position than the central portion in the front-rear direction of the pipe member 411. Further, the exit communication pipe 41 is fixed by welding at several portions in the circumferential direction, on the rear portion of the pipe member 411, to the exit communication pipe mounting portion 361a of the downstream side separator 36.

(Spark Arrester 5)

Figure 8:
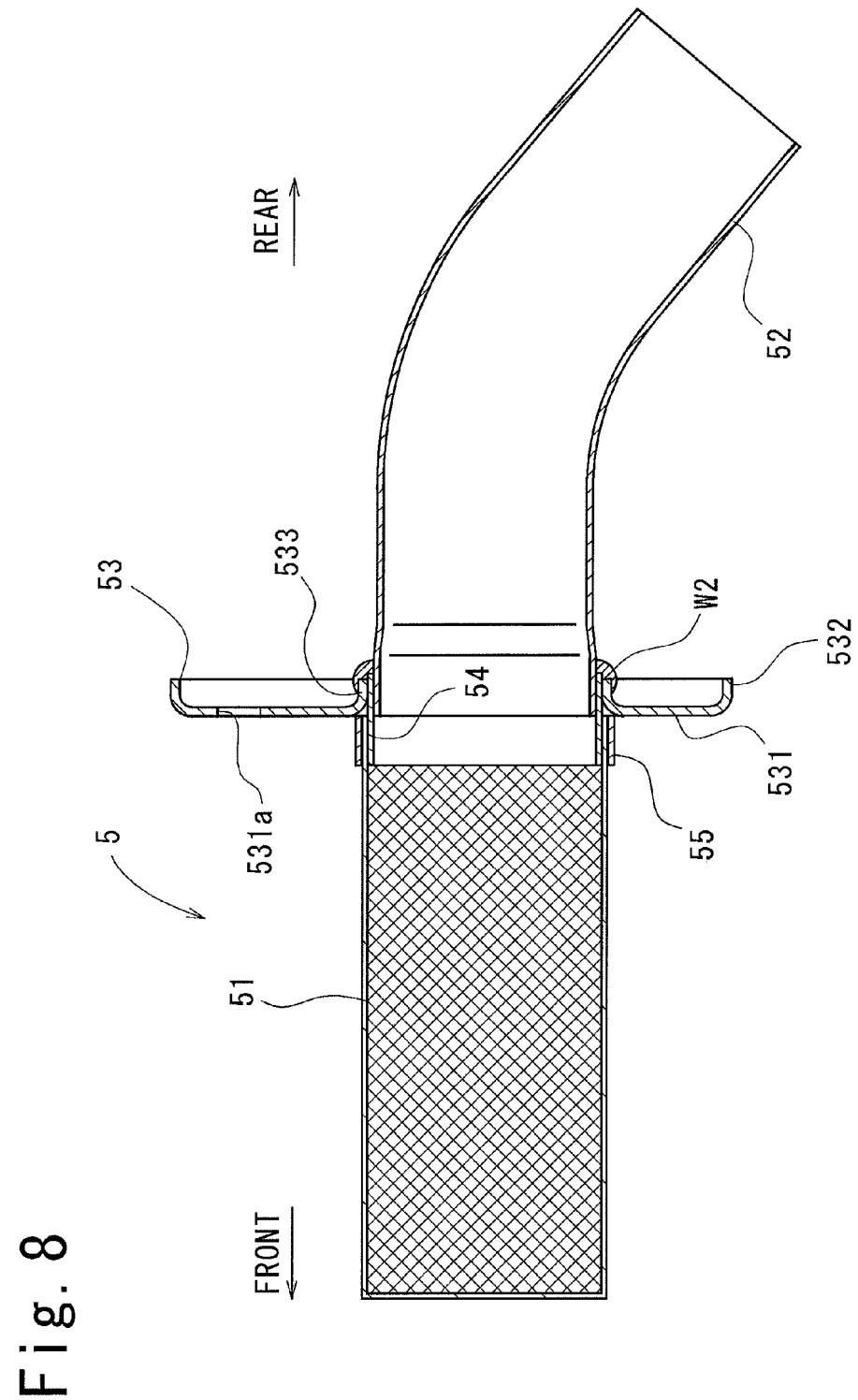
FIG. 8 is a vertical cross-sectional view of a spark arrester.
Figure 9:
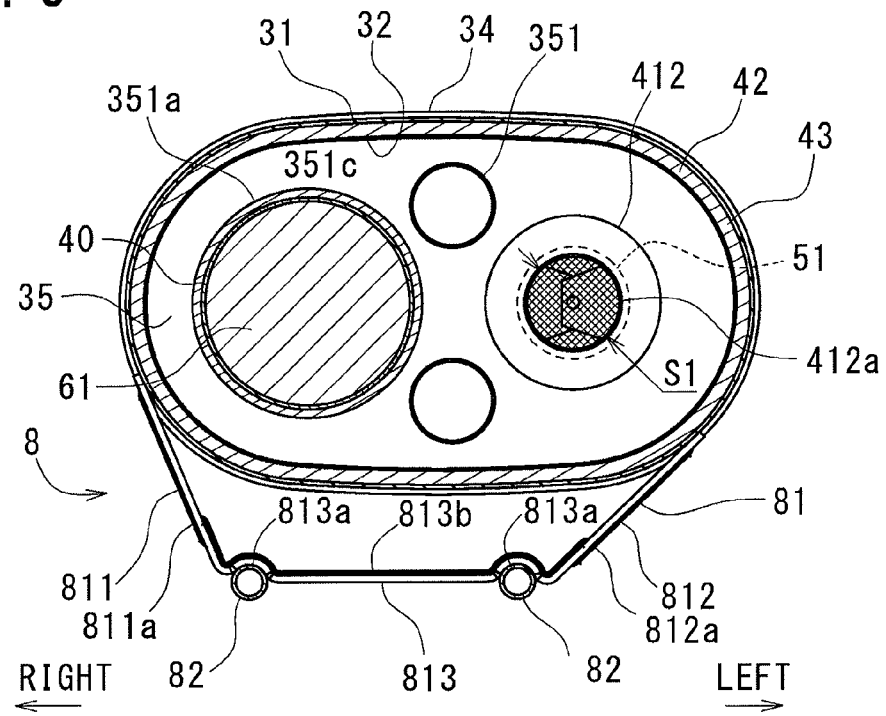
FIG. 9 is a IX-IX cross-sectional view of the exhaust muffler shown in FIG. 5.
Figure 10:
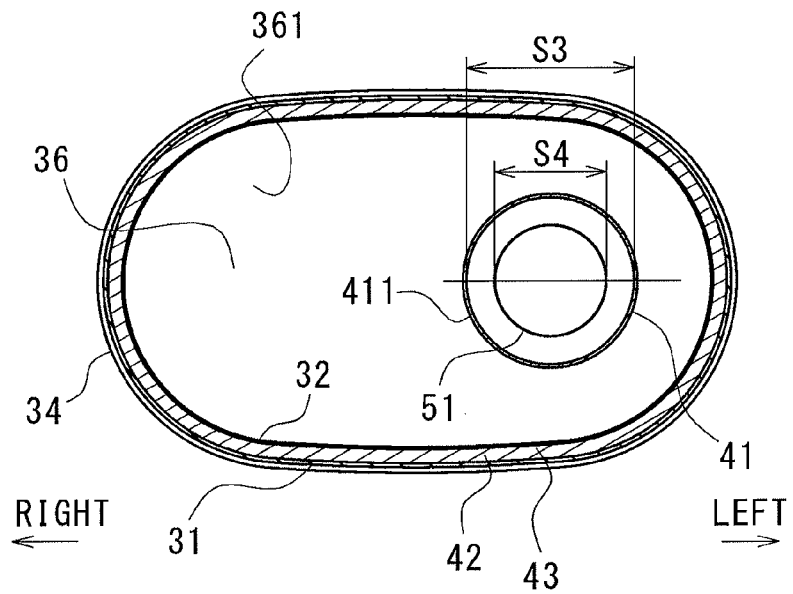
FIG. 10 is a X-X cross-sectional view of the exhaust muffler shown in FIG. 5.

Next, a description will be given of the spark arrester 5 with reference to FIGS. 8 to 10. FIG. 8 is a vertical cross-sectional view of the spark arrester 5. FIG. 9 is a IX-IX cross-sectional view of FIG. 5. FIG. 10 is a X-X cross-sectional view of FIG. 5. As shown in FIG. 8, the spark arrester 5 includes a spark arrester body portion 51 for capturing soot or carbon in exhaust gas, a tailpipe 52 for discharging the exhaust gas having passed through the spark arrester body portion 51 into the air, a spark arrester flange 53 for mounting the spark arrester 5 to the exhaust exit portion 342 (see FIG. 4), an inner circumferential ring 54 for coupling the spark arrester body portion 51 and the tailpipe 52 to each other, and an outer circumferential ring 55 for fixing the spark arrester body portion 51 to the inner circumferential ring 54.

The spark arrester body portion 51 is in a shape of a sleeve whose front end portion is closed while being open rearward. The circumference of the spark arrester body portion 51 is formed by having a mesh-like member made of metal cylindrically wrapped around such that its opposite peripheries overlap each other, and by fixing the overlapped peripheries at several portions by spot welding. Then, as shown in FIG. 9, the front portion of the spark arrester body portion 51 is formed by folding four sides of the circumferential portion inwardly, and fixing the substantially center portion of the overlapped mesh-like member by spot welding.

Referring back to FIG. 8, the tailpipe 52 is a pipe-like member, which extends rearward, and then curves diagonally downward. Thus, exhaust gas is caused to be discharged from the rear end portion of the tailpipe 52 in the rearward diagonally downward direction, that is, toward the ground.

The spark arrester flange 53 includes a substantially triangular base plate 531 (see FIG. 4), a sidewall 532 provided to stand rearward from the periphery of the base plate 531, and a tailpipe mounting portion 533 provided at the substantially center portion of the base plate 531 so as to project rearward. Near each vertex of the substantially triangle base plate 531, a spark arrester mounting hole 531a is bored. As shown in FIG. 4, by allowing a bolt 10 to penetrate through the spark arrester mounting hole 531a so as to screw to the spark arrester mounting portion 342c, the spark arrester 5 is removably fixed to the exhaust exit portion 342. Further, as shown in FIG. 5, the spark arrester body portion 51 is positioned in the exit communication pipe 41 in the state where the spark arrester 5 is fixed to the muffler body 3.

Referring back to FIG. 8, the outer circumferential ring 55 is a cylindrical element opening in the front-rear direction, and is fitted to the outer circumferential portion of the spark arrester body portion 51 with its rear end portion substantially matched with the rear end portion of the spark arrester body portion 51. The inner circumferential ring 54 is a cylindrical element that opens in the front-rear direction and that is structured to be longer in the longitudinal direction than the outer circumferential ring 55. The inner circumferential ring 54 is fitted to the inner circumferential portion of the spark arrester body portion 51 while being substantially matched with the front end portion of the outer circumferential ring 55. That is, the rear end portion of the inner circumferential ring 54 is positioned on the rear side of the spark arrester body portion 51.

By allowing the rear end portion of the spark arrester body portion 51 to be inserted between the inner circumferential ring 54 and the outer circumferential ring 55, and fixing the inner circumferential ring 54 and the outer circumferential ring 55 to each other by spot welding, the spark arrester body portion 51 made of a mesh-like member is surely fixed to the inner circumferential ring 54 and the outer circumferential ring 55 each being a plate-like member.

At the rear portion of the inner circumferential ring 54, the tailpipe 52 is fitted to the inner circumferential side, and the tailpipe mounting portion 533 of the spark arrester flange 53 is fitted to the outer circumferential side. The rear end portion of the tailpipe mounting portion 533 is positioned slightly frontward relative to the rear end portion of the inner circumferential ring 54. Thus, the rear end portion of the tailpipe mounting portion 533 and the rear end portion of the inner circumferential ring 54 are arranged stepwise on the outer circumference face of the tailpipe 52, and these three components are integrally joined by a common welding bead W2.

Here, with reference to FIGS. 9 and 10, a description will be given of a cross-sectional area of the exhaust flow path defined by the spark arrester 5 and the exit communication pipe 41. Firstly, with reference to FIG. 9, the opening area S1 of the opening 412a is designed to be substantially identical to the cross-sectional area S2 (see FIG. 2) of the exhaust flow path at the upstream end of the exhaust pipe 7. Further, with reference to FIG. 10, the inner diameter of the pipe member 411 is set such that the difference between the cross-sectional area S3 being perpendicular to the exhaust flow path of the pipe member 411 and the cross-sectional area S4 being perpendicular to the exhaust flow path of the spark arrester body portion 51 becomes substantially identical to the opening area S1 (see FIG. 9) of the opening 412a. That is, for the cross-sectional area of the exhaust flow path defined by the spark arrester 5 and the exit communication pipe 41, the cross-sectional area S2 of the exhaust flow path at the upstream end of the exhaust pipe 7 is secured.

(Exhaust Muffler Mounting Apparatus 8)

Next, a description will be given of the exhaust muffler mounting apparatus 8. As shown in FIG. 9, the exhaust muffler mounting apparatus 8 includes a metal-made rod support plate 81 fixed by welding to the outer circumference face of the outer sleeve 31, and a right and left pair of metal-made rods 82 fixed by welding to the bottom end portion of the rod support plate 81. The rod support plate 81 has a first inclined portion 811 extending from the right lower portion of the outer sleeve 31 in the diagonally left downward direction, a second inclined portion 812 extending from the left lower portion of the outer sleeve 31 in the diagonally right downward direction, and a horizontal portion 813 that connects between the bottom ends of the first and second inclined portions 811 and 812 and that extends substantially horizontally. The rods 82 extend in the front-rear direction.

The first and second inclined portions 811 and 812 are respectively provided with reinforcing beads 811a and 812a provided in the direction being away from the outer sleeve 31 in a concave manner. Further, the horizontal portion 813 is provided with rod mounting portions 813a for mounting the rods 82 and a reinforcing bead 813b provided in a concave manner toward the outer sleeve 31. The rod mounting portions 813a are formed as a right and left pair. The reinforcing bead 813b is formed over the joining portion of the horizontal portion 813 and the first and second inclined portions 811 and 812. Provision of the reinforcing beads 811a, 812a, and 813b improves rigidity of the rod support plate 81.

Further, since the reinforcing beads 811a and 812a are provided in a concave manner in the direction being away from the outer sleeve 31, the reinforcing beads 811a and 812a are prevented from abutting on the outer surface of the outer sleeve 31, whereby the first and second inclined portions 811 and 812 can easily conform to the outer surface of the outer sleeve 31. Thus, the first and second inclined portions 811 and 812 can be more surely fixed by welding to the outer sleeve 31.

Further, since the reinforcing bead 813b is provided in a concave manner toward the outer sleeve 31, the reinforcing bead 813b is prevented from abutting on the outer surface of the rods 82, whereby the rod mounting portions 813a can easily conform to the outer surface of the rods 82. Thus, the rods 82 can be more surely fixed by welding to the rod mounting portions 813a.

As shown in FIG. 2, by allowing the right and left pair of rods 82 to be inserted into the bores of the rubber dampers 242a of the exhaust muffler mounting portion 24 mounted on the transmission 22 from the rear side toward the front side, the exhaust muffler 2 can be surely held above the transmission 22.

The exhaust system 1 has its front portion fixed to the exhaust portion 21 of the engine 20 via the flange 71, and has its rear portion fixed to the exhaust muffler mounting portion 24 provided to the transmission 22 via the exhaust muffler mounting apparatus 8. Further, the transmission 22 is fixed to the engine 20 so as not to be relatively displaced. That is, since the exhaust system 1 including the front portion and the rear portion is fixed to the identical vibration system, it is not necessary to take into consideration of the relative displacement that occurs when the front portion and the rear portion are fixed to separate vibration systems. Thus, the exhaust system 1 is strongly fixed.

Further, since the exhaust muffler 2 is held by the rubber dampers 242a as being inserted in the front-rear direction via the rods 82, thermal elongation of the exhaust system 1 in the front-rear direction, dimensional variations in the front-rear direction of each component of the exhaust system 1, or assembly variations of each component are absorbed in an excellent manner.

(Gasket 9)

As shown in FIG. 4, the gasket 9 is a disc-like seal member exhibiting excellent heat resistance. The gasket 9 seals against leakage of exhaust gas from between the gasket mounting face 342a of the exhaust exit portion 342 and the base plate 531 of the spark arrester flange 53.

[Flow of Exhaust Gas]

Next, a description will be given of the flow of exhaust gas in the exhaust system 1. Firstly, as indicated by arrow A in FIG. 2, exhaust gas discharged from the exhaust portion 21 of the engine 20 passes through the exhaust pipe 7 and arrives at the exhaust muffler 2. At this time, the exhaust gas enters from the entrance cone portion 73 of the exhaust pipe 7 and arrives at the exhaust entrance portion 332 (see FIG. 3). Here, as indicated by arrow B in FIG. 5, since the entrance cone portion 73 has a cone shape whose diameter widens rearward, the exhaust gas passing through the entrance cone portion 73 arrives at the exhaust entrance portion 332 while substantially uniformly diffusing in the radial direction.

Next, as indicated by arrow C in FIG. 5, the exhaust gas flows into the entrance communication pipe 40. Since the catalyst 6 is arranged as being away by a prescribed length from the upstream side end portion of the entrance communication pipe 40, the exhaust gas is further diffused in the radial direction while proceeding in the entrance communication pipe 40 until it arrives at the catalyst 6. As a result, at the upstream side end face of the catalyst 6, the exhaust gas that is substantially evenly distributed in the radial direction arrives.

Next, as indicated by arrow D in FIG. 5, the exhaust gas purified by the catalyst 6 arrives at the first expansion chamber 37. At this time, the temperature of the exhaust gas increases by the oxidation-reduction reaction of the catalyst 6. As the exhaust gas expands in the first expansion chamber 37, the back pressure and the exhaust noises are reduced. Note that, since the heat insulation chamber 39 is provided via the downstream side separator 36, the exhaust gas having passed through the catalyst 6 and achieving high temperatures is blocked by the heat insulation chamber 39, and therefore will not blow in the downstream side cover 34. Thus, the downstream side cover 34 is prevented from achieving high temperatures, and durability of the downstream side cover 34 is enhanced.

Further, around the first expansion chamber 37, the sound absorption chamber 42 where the sound absorbing material 43 is arranged is provided via the inner sleeve 32. Therefore, the exhaust noises emitted from the first expansion chamber 37 are prevented from passing through the sleeve portion 30 and emitted to the outside of the exhaust muffler 2.

Next, as indicated by arrow E in FIG. 5, the exhaust gas passes through a pair of communication holes 351c (see FIG. 4) provided at the upstream side separator 35, and arrives at the second expansion chamber 38. The exhaust gas has its flow regulated when it passes through the communication holes 351c, whereby the back pressure and the exhaust noises are further reduced. Then, the exhaust gas having passed through the communication holes 351c is expanded in the second expansion chamber 38, and the back pressure and the exhaust noises are even more reduced. In addition, since the second expansion chamber 38 communicates, through the pores 322, with the sound absorption chamber 42 formed around the second expansion chamber 38, the exhaust noises in the second expansion chamber 38 are absorbed by the sound absorbing material 43 arranged in the sound absorption chamber 42. Thus, the exhaust noise is still even more reduced.

Next, as indicated by arrow F in FIG. 5, the exhaust gas passes through the opening 412a of the lid member 412 and flows into the exit communication pipe 41. The opening 412a is burring shaped, and is smaller than the passage diameter of the pipe member 411. Therefore, when the exhaust gas flows into the exit communication pipe 41 from the second expansion chamber 38, the exhaust flow path is sharply narrowed by the opening 412a, whereby the back pressure and the exhaust noises of the exhaust gas are effectively reduced.

Note that, since the opening area S1 (see FIG. 9) of the opening 412a is formed to be substantially as great as the cross-sectional area S2 (see FIG. 2) of the exhaust flow path in the upstream end portion of the exhaust pipe 7, the exhaust flow path is prevented from excessively narrowed by the opening 412a, and the exhaust flow path of proper size is secured.

Next, as indicated by arrow G in FIG. 5, the exhaust gas flows into the inner circumferential side of the spark arrester body portion 51 from the outer circumferential portion of the spark arrester body portion 51. When the exhaust gas passes through the spark arrester body portion 51, soot, carbon and the like in the exhaust gas are captured by the mesh-like member of the spark arrester body portion 51.

Since the spark arrester body portion 51 is arranged in the exit communication pipe 41 being separated from the first and second expansion chambers 37 and 38, the back pressure with an exhaust pulse in the first and second expansion chambers 37 and 38 will not act on the spark arrester body portion 51. Further, since the back pressure is effectively reduced by the opening 412a of the lid member 412, the back pressure acting on the spark arrester body portion 51 is sufficiently reduced.

Note that, in the exit communication pipe 41, the passage area of the exhaust flow path formed around the spark arrester body portion 51, that is, the difference between the cross-sectional area S3 (see FIG. 10) of the pipe member 411 and the cross-sectional area S4 (see FIG. 10) of the spark arrester body portion 51, is set to be substantially identical to the opening area S1 (see FIG. 9) of the opening 412a of the lid member 412. Thus, while securing the passage area of the exhaust flow path in the exit communication pipe 41, an excessive increase in the diameter of the pipe member 411 is avoided.

Finally, as indicated by arrow H in FIG. 5, the exhaust gas flows into the tailpipe 52, and is discharged from the rear end portion of the tailpipe 52 into the air. In this manner, the exhaust gas discharged from the exhaust portion 21 (see FIG. 2) of the engine 20 arrives at the exhaust muffler 2. Then, the exhaust gas is purified in the exhaust muffler 2, and discharged from the tailpipe 52 into the air with fully suppressed exhaust noises.

[Effect of Embodiment]

(1) By the common welding bead W1, the entrance cone portion 73 of the exhaust pipe 7 and the entrance communication pipe 40 can be joined together to the exhaust entrance portion 332 of the upstream side cover 33. Thus, the welding place for joining the entrance cone portion 73 to the peripheral portion of the exhaust entrance portion 332 and the welding place for joining the entrance communication pipe 40 to the peripheral portion of the exhaust entrance portion 332 can be unified, whereby the number of welding places can be reduced.

(2) The catalyst 6 can be arranged in the muffler body 3 without inviting an increase in the number of components and welding places. That is, in the case where the catalyst 6 is stored in a catalyst retaining pipe and the catalyst retaining pipe is joined to the entrance communication pipe 40, it becomes necessary to separately prepare the catalyst retaining pipe, and the catalyst retaining pipe and the entrance communication pipe 40 must be joined to each other. However, the catalyst 6 is directly arranged in the entrance communication pipe 40, whereby the catalyst retaining pipe can be dispensed with, and the number of welding places for joining the catalyst retaining pipe and the entrance communication pipe 40 to each other can be reduced.

(3) The catalyst 6 is arranged as being distanced from the upstream side end portion of the entrance communication pipe 40 by a prescribed length. Therefore, exhaust gas is further radially diffused while it progresses toward the downstream side in the entrance communication pipe 40 before arriving at the catalyst 6. Thus, the exhaust gas is allowed to uniformly flow toward the upstream side end face of the catalyst 6. In this manner, the flow of exhaust gas toward the catalyst 6 can be suppressed from becoming unbalanced, and the catalyst 6 can be efficiently activated.

The present invention is not limited to the embodiment described above, and various modifications can be employed in the range not departing from the claims.

What is claimed is:

1. An exhaust muffler for a vehicle comprising
a muffler body connected to an exhaust pipe and including therein a plurality of expansion chambers, the muffler body shaving:
- an upstream side cover having an exhaust entrance connected to the exhaust pip, and the upstream side cover closing an upstream side opening of the muffler body; and
- a communication pipe coupling one of the plurality of expansion chambers positioned in a most upstream side part of an exhaust flow path and the exhaust entrance to each other;
- wherein the exhaust entrance is protrusion-shaped and projects in an upstream direction, an upstream portion of the protrusion-shaped exhaust entrance being externally fitted to an outer circumferential surface of the communication pipe;
- wherein an upstream end of the protrusion-shaped exhaust entrance is located downstream of an upstream end of the communication pipe, and the upstream end of the protrusion-shaped exhaust entrance and the upstream end of the communication pipe being arranged in a stepwise manner on the outer circumferential surface of the exhaust pipe; and
- the exhaust pipe and the communication pipe are integrally joined to a peripheral portion of the protrusion-shaped exhaust entrance by a common welding bead located outside of the muffler body.

2. The exhaust muffler for a vehicle according to claim 1, wherein:
- a catalyst is arranged inside the communication pipe; and
- the exhaust pipe has an entrance cone portion with a diameter increasing in a downstream direction of the entrance cone portion toward a connecting portion connected to the protrusion-shaped exhaust entrance.

3. The exhaust muffler for a vehicle according to claim 2, wherein:
- an inner diameter of the communication pipe is substantially identical to an outer diameter of the catalyst, and a length of the communication pipe in an exhaust flow path direction is at least approximately twice as great as a length of the catalyst, and
- the catalyst is arranged near a downstream end part of the exhaust flow path in the communication pipe.

* * * * *